United States Patent
Chen et al.

(10) Patent No.: US 8,997,032 B2
(45) Date of Patent: Mar. 31, 2015

(54) METHOD FOR INPUT/OUTPUT DESIGN OF CHIP

(71) Applicants: Global Unichip Corporation, Hsinchu (TW); Taiwan Semiconductor Manufacturing Co., Ltd., Hsin-Chu (TW)

(72) Inventors: Shi-Hao Chen, Nantou County (TW); Tsung-Ying Tsai, Hsinchu (TW); Chao-Yen Huang, Taipei (TW)

(73) Assignees: Global Unichip Corporation, Hsinchu (TW); Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/863,503

(22) Filed: Apr. 16, 2013

(65) Prior Publication Data
US 2013/0283221 A1  Oct. 24, 2013

(30) Foreign Application Priority Data
Apr. 18, 2012 (TW) ............................. 101113853 A

(51) Int. Cl.
*G06F 17/50* (2006.01)
(52) U.S. Cl.
CPC ........ *G06F 17/5081* (2013.01); *G06F 17/5068* (2013.01); *G06F 2217/40* (2013.01); *G06F 2217/78* (2013.01)

USPC ......................................................... 716/112
(58) Field of Classification Search
CPC ............ G06F 2217/82; G06F 17/5068; G06F 17/5081; G06F 2217/40; G06F 2217/78; H03K 19/17744
See application file for complete search history.

(56) References Cited

U.S. PATENT DOCUMENTS

| 7,139,691 | B1 | 11/2006 | Duong | |
|---|---|---|---|---|
| 7,353,476 | B2 | 4/2008 | Imada et al. | |
| 7,523,430 | B1* | 4/2009 | Patel | 716/115 |
| 7,788,620 | B1* | 8/2010 | Xue et al. | 716/113 |
| 2002/0095647 | A1* | 7/2002 | Bernstein et al. | 716/10 |
| 2004/0128626 | A1* | 7/2004 | Wingren et al. | 716/1 |
| 2004/0194048 | A1* | 9/2004 | Arnold | 716/17 |
| 2011/0167395 | A1* | 7/2011 | Soreff et al. | 716/108 |

\* cited by examiner

*Primary Examiner* — Vuthe Siek
*Assistant Examiner* — Aric Lin
(74) *Attorney, Agent, or Firm* — WPAT, PC; Justin King

(57) ABSTRACT

Method for input/output (IO) design of a chip, including: according to a signal IO pin sequence and associated driving parameters, sequentially placing a signal IO cell in the IO design associated with each of the signal IO pins; after a signal IO cell is placed, performing a simultaneous switching output (SSO) verification step according to physical layout parameters and locations of the signal IO cells placed in the IO design, so as to check whether an SSO specification is violated; if not violated, continuing to place a signal IO cell of a next signal IO pin; if violated, including a decoupling capacitor, an IO power cell and/or an IO ground cell in the IO design.

17 Claims, 3 Drawing Sheets

METHOD FOR INPUT/OUTPUT DESIGN OF CHIP

This application claims the benefit of Taiwan Patent Application No. 101113853, filed Apr. 18, 2012, the subject matter of which is incorporated herein by reference.

FIELD OF THE INVENTION

The present invention relates to a method for input/output (IO) design of chip, and more particularly, to a chip IO design method which integrates information about geometric locations of signal IO cells during consideration of simultaneous switching output (SSO).

BACKGROUND OF THE INVENTION

Chips (including dice, integrated circuits and/or system-on-chips, etc.) form one of the most important hardware foundations of modern information society, chip designers are also eagerly developing better strategy, flow and technology of chip design not only to satisfy basic demands and specifications of customers but also to minimize chip layout area for cost reduction.

Please refer to FIG. 1 illustrating an embodiment of a chip 10. The chip 10 includes a core circuit 14 and an IO interface 12. The core circuit 14 dominates chip functionality and operation, and the IO interface 12 surrounds the core circuit 14 in a ring region. The IO interface 12 includes various signal input and/or output pads generally referred to as signal IO pads which correspond to signal IO pins, as well as IO power pads and IO ground pads which are generally referred to as IO supply pads corresponding to IO supply pins; for example, pads Pio[i−1], Pio[i] and Pio[i+1] shown in FIG. 1 are signal IO pads, a pad Ppwr[j] is an IO power pad, and a pad Pgnd[k] is an IO ground pad.

For the chip 10 to exchange data and signals with external environment such as another chip, active and/or passive element(s) mounted on a same circuit board, each signal IO pad Pio[i] of the IO interface 12 associates with a signal IO cell SION. Via the associated signal IO pad Pio[i], each signal IO cell SIO[i] drives output signal to loading of external environment and/or receives input signal from external environment. The input signal received by a signal IO cell is further transmitted to the core circuit 14, such that the core circuit 14 can work and/or execute functions in response to the input signal. Operation statuses and computation/execution results of the core circuit 14 can also be transmitted to a signal IO cell to be driven as output signal.

Similarly, for the chip 10 to drain required power from external environment, each IO power pad Ppwr[j] associates with an IO power cell IOpwr[j], hence a power voltage Vddext supplied by external environment is distributed as a power voltage VddIO in the chip 10 via a power stripe 16a; also, each IO ground pad Pgnd[k] associates with an IO ground cell IO gnd[k], thus a ground voltage Vssext provided by external environment is distributed as a ground voltage Vss in the chip 10 via a power stripe 16b. The IO power cell IOprw[j] and the IO ground cell IOgnd[k] are generally referred to as IO supply cells.

While purchasing a chip, the application customer of the chips specifies signal IO pins required to be included in the chip, a logic order of the signal IO pins (i.e., a signal IO pin sequence), and timing specifications to be respectively followed by the signal IO pins. According to demands of the signal IO sequence and the timing specifications, the chip designer then performs IO design for the chip, i.e., organizes signal IO cells and IO supply cells for the chip.

The power for the core circuit 14 and the signal IO cells SIO[i] is drained via the IO supply pads. Because each signal IO cell SIO[i] needs to handle signal IO of high voltage and high current, it requires high power; however, high power requirement of the signal IO cells SIO[i] will impact the power voltage VddIO and ground voltage Vss inside the chip 10. For example, when a signal IO cell SIO[i] drives a signal for a switching (transition) from a low level to a high level, the power voltage VddIO suffers a transient drop; when a signal IO cell SIO[i] drives a signal switching from high level to low level, the ground voltage Vss rises temporarily.

As chip needs to serve more functions, it requires more signal IO pads/pins. When many signal IO cells simultaneously drive their output signals to switch (referred to as simultaneous switching output, SSO), impacts to the power voltage VddIO and/or the ground voltage Vss additively accumulate and consequently induce simultaneous switching noise (SSN). For example, at a given moment, assuming a signal IO cell SIO[i1] only needs to steadily and statically maintain a signal of low level; however, if an enough number of other signal IO cells SIO[i2] (i2 not equal to i1) are simultaneously driving switching from high level to low level, signal level of the signal IO cell SIO[i1] will be raised due to the influenced power voltage VddIO and/or ground voltage Vss, and thus fails to be kept at the correct low level; if the signal level of the signal IO cell SIO[i1] is raised above a standard voltage ViL, the IO design violates a ground SSO specification.

Similarly, assuming a signal IO cell SIO[i1] only needs to steadily and statically maintain a signal of high level; however, when an enough number of other signal IO cells SIO[i2] (i2 not equal to i1) are simultaneously driving switching from low level to high level, signal level of the signal IO cell SIO[i1] will be lowered due to the affected power voltage VddIO and/or ground voltage Vss, and then fails to be kept at the correct high level; if the signal level of the signal IO cell SIO[i1] drops below a standard voltage ViH, the IO design violates a power SSO specification. The ground SSO specification and the power SSO specification are generally referred to as an SSO specification.

The power voltage Vddext and ground voltage Vssext supplied by external environment are respectively transmitted to be the power voltage VddIO and ground voltage Vss via a circuit board PCB (e.g., via traces on the circuit board), a chip package PKG (e.g., bonding wires and/or lead frame), associated IO supply pads and power stripes inside the chip. Therefore, when multiple signal IO cells simultaneously drive signal switching and induce SSN, magnitude of the noise relates to equivalent (parasite) circuits of the circuit board, the chip package, the IO supply pads and the power stripes. For example, as inductance of the equivalent circuits becomes greater, resultant impact to the power voltage VddIO and ground voltage Vss is severer, and SSN is stronger. Increasing quantity of the IO supply pads/cells in a chip can effectively reduce inductance of the equivalent circuits; however, an excessively incremented number of IO supply cells/pins will expand overall layout area of the chip and thus increase cost of the chip.

On the other hand, there are different types of signal IO cells; different types of signal IO cells associate with different driving parameters. For example, the driving parameters can include driving strength and slew rate. If a signal IO cell has higher driving strength (and/or slew rate), its signal will benefit from better current amount, quality, characteristics and timing (e.g., waveform, eye diagram, rise time and fall time, etc.), also the signal IO cell can better resist quality variation of circuit board and chip package; however, when such signal IO cell drives signal switching, it causes greater impact to power and ground voltages, and consequently strengthens SSN.

In prior art of IO design technology, each of different types of signal IO cells is assigned with an associated driving factor (DF) according to the SSO specification; the DF of a signal IO cell indicates how many IO supply cells the signal IO cell averagely needs to meet the SSO specification. After selecting associated cell types and quantities for signal IO pins of an IO design, a sum of driving factors (SDF) is evaluated according to quantities of the signal IO cells and their associated driving factors. Based on the SDF, numbers of IO power cells and IO ground cells are determined. For example, assuming a certain chip requires IO signal IO cells of 2 mA (signal IO cells capable of driving output signal by current of 2 mA), 6 signal IO cells of 8 mA and 26 signal IO cells of 24 mA, and the driving factors for the signal IO cells of 2 mA, 8 mA and 24 mA are respectively 0.012, 0.063 and 0.26, then the SDF is computed by 0.012*10+0.063*6+0.26*24=7.258; the SDF is further fine-tuned and rounded, and accordingly concludes that the IO design of the chip needs 8 IO ground cells and 7 IO power cells.

Disadvantages of the aforementioned prior art are discussed as follows. Because the driving factors are fractional, the SDF also includes a fraction portion which is rounded to obtain integer quantities of IO supply cells; hence, IO design of the prior art suffers from over-design, which means that the IO design tends to adopt excessive numbers of IO supply pins, and thus impacts prevalence of chip by increased total pin count, overall layout area and cost of the chip.

Furthermore, the prior art only considers numbers of IO supply cells, while geometric locations of signal IO cells and IO supply cells are left unconsidered. For example, as shown in FIG. 1, the IO power cell IOpwr[j] and IO ground cell IOgnd[k] respectively relay the power voltage VddIO and ground voltage Vss to each signal IO cell SIO[i] via the power stripes 16a and 16b, therefore lengths of the power stripes 16a and 16b (related to distance between signal IO cell and IO power cell, as well as distance between signal IO cell and IO ground cell) and associated parasite effects are factors to affect SSN. However, because the prior art ignores such factors, there is no way to know preferable locations for placing IO supply cells, and it is difficult to achieve better trade-off between SSN suppression and pin count reduction.

In addition, as shown in FIG. 1, each signal IO cell SIO[i] drives an associated external loading LD[i] via the chip package PKG and the circuit board PCB. However, the prior art does not consider parasite effects of chip package and/or circuit board, thus IC designer of prior art tends to adopt signal IO cells of higher driving strength (and/or slew rate), such that timing specifications of signal IO cells are satisfied by expanded driving margin. In other words, due to lack of integrated consideration, IC designer of prior art needs to over-design driving strength. Since signal IO cells of higher driving strength need more IO supply cells to meet SSO specification, reduction of chip pin count is suffered Moreover, while setting driving factors for different types of signal IO cells, a driving index is first obtained for each type of signal IO cell. The meaning of the driving index can be described as follows: assuming a number N of signal IO cells of a same type are arranged with a single IO ground cell; when the N signal IO cells simultaneously drive signal switching from high level to low level, if another signal IO cell of the same type, which is not driving signal switching, can keep its low-level signal below the standard voltage ViL, then the number N matches a driving index condition. For all numbers N satisfying the driving index condition, the maximum one is taken as the driving index for this type of signal IO cell, and a reciprocal of the driving index is the driving factor associated with this type of signal IO cell. That is, a driving factor only considers signal IO cells of the same type; if the IO design adopts a mixed arrangement including signal IO cells of different types, correctness of driving factor is affected; consequently, the prior art can not assure correctness of whole IO design.

SUMMARY OF THE INVENTION

To address issues of prior art, an objective of the invention relates to a method for providing an IO design of a chip according to a signal IO pin sequence of the chip. The signal IO pin sequence includes a plurality of signal IO pins to be implemented, each signal IO pin associates with an IO timing specification. The method of the invention includes: performing a setting step by setting associated driving parameters for each signal IO pin; performing a timing verification step by checking, according to the associated driving parameters of each IO pin, whether operation timing of each signal IO pin violates the associated IO timing specification; if operation timing a signal IO pin does not violate the associated IO timing specification according to the associated timing verification step, setting an associated cell type for the signal IO pin according to the associated driving parameters of the signal IO pin; if operation timing of a signal IO pin violates the associated IO timing specification according to the timing verification step, changing the slew rate of the associated driving parameters, and performing a timing re-verification step by checking again whether operation timing of the signal IO pin violates the associated IO timing specification after the changed driving parameters are applied; if operation timing of the signal IO pin still violates the associated IO timing specification according to the timing re-verification step, changing the driving strength of the associated driving parameters and accordingly repeating the setting step; if operation timing of the signal IO pin does not violate the associated IO timing specification according to the timing re-verification step, repeating the setting step, such that an associated cell type for the signal IO pin is set according to the changed driving parameters associated with the signal IO pin. During the timing verification step and the timing re-verification step, while checking whether operation timing of each signal IO pin violates the associated IO timing specification according to the associated driving parameters, the operation timing driven by the signal IO cell is obtained by a numerical simulation executed according to the driving parameters, supply, frequency, chip package, circuit board and/or loading associated with the signal IO pin.

The method further includes: according to the associated cell type of each signal IO pin, selecting a signal IO cell to be placed in the IO design for each signal IO pin, and sequentially placing each signal IO cell according to the signal IO pin sequence; that is, performing a signal IO cell insertion step by placing a signal IO cell in the IO design according to a signal IO pin of the signal IO pin sequence, and performing an SSO calculation step by a numeric SSO calculation for signal IO cell(s) already placed in the IO design; also, performing an SSO verification step by checking, according to calculation result of the SSO calculation step, whether the IO design violates an SSO specification; if the IO design does not violate the SSO specification, repeating the signal IO cell insertion step by placing another signal IO cell in the IO design according to a next signal IO pin of the signal IO pin sequence.

The method also includes: after the SSO verification step, if the IO design violates the SSO specification, adding a decoupling capacitor in the IO design, and performing an SSO re-verification step by checking whether the IO design violates the SSO specification according to a numerical SSO calculation for signal IO cells already placed in the IO design; if the IO design violates the SSO specification according to the SSO re-verification step, adding an IO supply cell in the IO design, and then repeating the SSO calculation step.

In an embodiment, the SSO specification includes a power SSO specification and a ground SSO specification, and the SSO re-verification step (as well as the SSO verification step) is performed by checking whether the IO design violates the power SSO specification and the ground SSO specification. If the IO design violates the power SSO specification according to the SSO re-verification step, add an IO power cell in the IO design, wherein the IO power cell includes an IO power pad for coupling a power voltage; similarly, if the IO design violates the ground SSO specification according to the SSO re-verification step, adding an IO ground cell in the IO design, wherein the IO ground cell includes an IO ground pad for coupling a ground voltage.

During the SSO calculation step, the numerical SSO calculation is performed according to physical layout parameters and locations of the placed signal IO cells.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
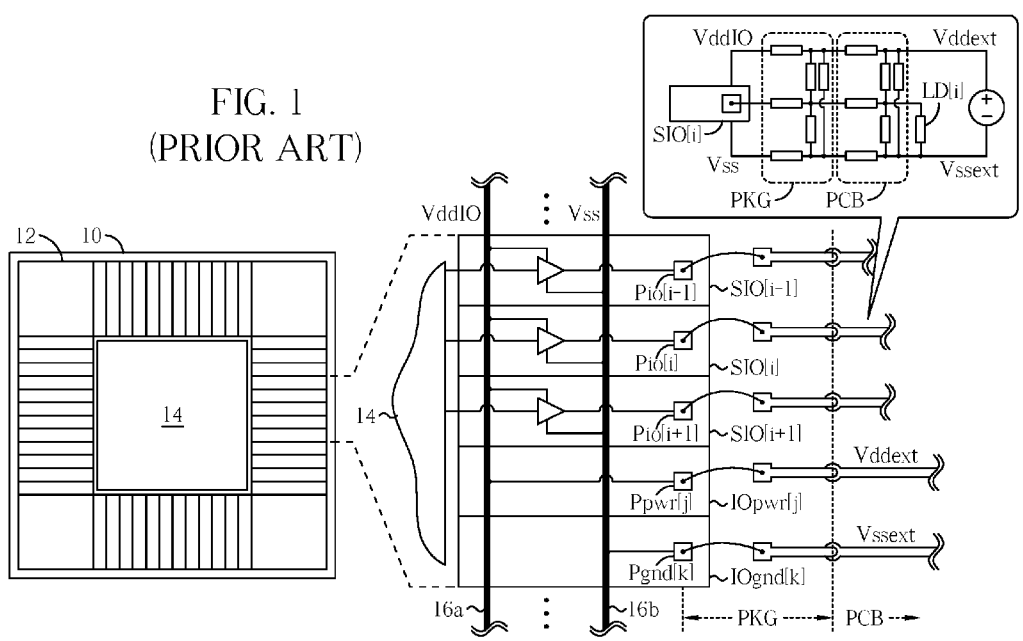
FIG. 1 (prior art) illustrates an embodiment of a chip.
Figure 2:
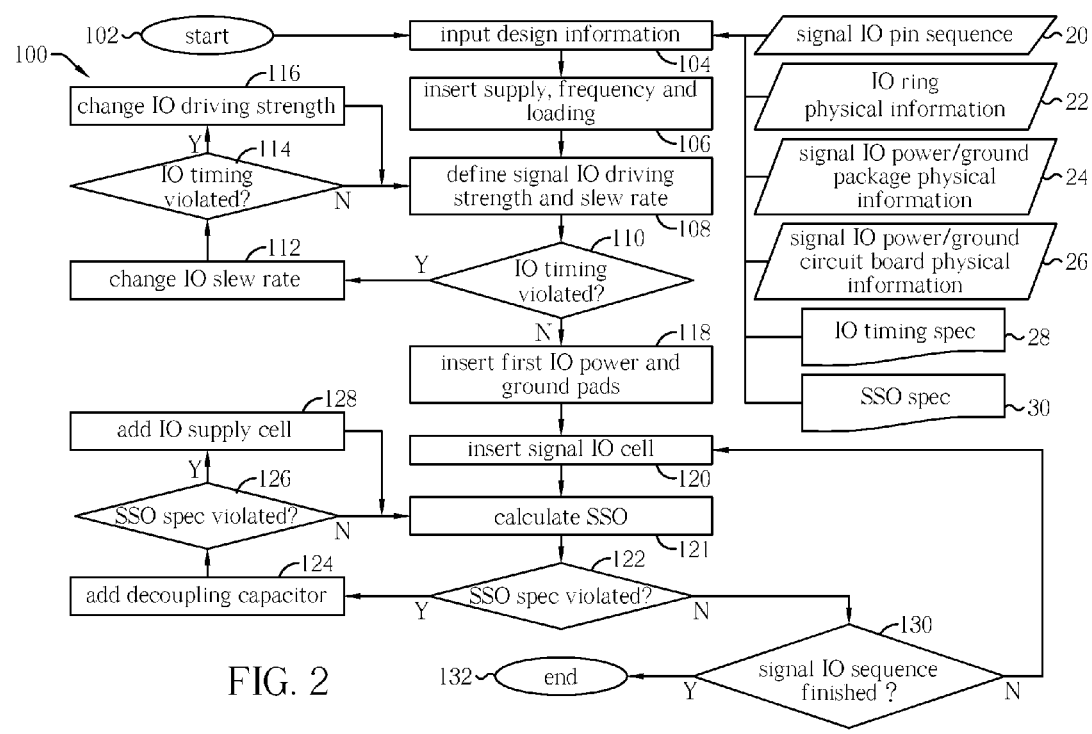
FIG. 2 illustrates an IO design flow according to an embodiment of the invention.

Please refer to FIG. 2 illustrating a flow 100 according to an embodiment of the invention, the flow 100 implements IO design technology of the invention to provide an IO design of a chip. Major steps of the flow 100 are described as follows.

Step 102: start the flow 100.

Step 104: input design information. For example, design information 20 to 30 listed in FIG. 2 can be included in IO design consideration of the invention. The design information 20, 22, 24, 26, 28 and 30 can respectively be a signal IO pin sequence, IO ring physical information, signal IO power/ground package physical information, signal IO power/ground circuit board physical information, IO timing specification and SSO specification (checking rules).

The signal IO pin sequence of the design information 20 records signal IO pins required to be implemented in the IO design, including number of the signal IO pins, logic arrangement order of the signal IO pins, and/or required minimal driving strength and/or slew rate of each signal IO pin. The design information 28 associates with the design information 20; the design information 28 records the IO timing specification associated with each signal IO pin, including timing rule(s) which must be followed by each signal IO pin, such as signal output eye diagram, waveform demands and/or rise time/fall time.

The design information 22 records physical information of IO ring; as an IO ring is a region allocated for placement of signal IO cells and IO supply cells, the IO ring physical information can include dimensions and physical material parameters of the IO ring, such as parasite resistance, inductance and capacitance per unit area of conductive layer(s), e.g., metal layer(s) and/or poly-silicon layer(s).

The design information 24 records physical information of package related to signal IO; as signal IO pads, IO power pads and/or IO ground pads of the chip are coupled to circuit board via boding wires and/or lead frame(s), locations, dimensions, parasite effects and/or conductivities of the bonding wires and/or lead frame(s) can be included in the design information 24.

Similarly, signal IO pads of the chip are coupled to external loadings via signal traces on circuit board (e.g., printed circuit board), IO power pads and/or IO ground pads are coupled to external power source(s) via supply traces of the circuit board, thus locations, dimensions, parasite effects and/or conductivities of these signal traces and supply traces can be included in the design information 26.

The design information 30 records the SSO specification must be met by the IO design; for example, the SSO specification includes a power SSO specification and a ground SSO specification respectively related to the standard voltages ViH and ViL.

Step 106: include supply (e.g., level of power voltage), frequency (e.g., signal frequency) and loading of each signal IO pin into IO design consideration.

Step 108: define associated driving strength and/or slew rate of each signal IO pin of the signal IO pin sequence; accordingly, type of signal IO cell adopted to implement each signal IO pin can be selected. This step 108 can be regarded as a setting step which sets associated driving parameters (such as driving strength and/or slew rate) for each signal IO pin.

Step 110: execute a timing verification step; according to driving parameters of each signal IO pin, check whether operation timing of each signal IO pin violates the associated IO timing specification (the design information 28). While performing the timing verification step for a signal IO pin of the signal IO pin sequence, if the IO timing specification associated with the signal IO pin is not violated, it means that the driving parameters set for the signal IO pin at step 108 can be utilized to match the associated IO timing specification; hence, a cell type can be selected for the signal IO pin according to the driving parameters set in step 108, i.e., a signal IO cell is selected to implement the signal IO pin. If all signal IO pins of the signal IO pin sequence do not violate respect IO timing specifications, the flow 100 proceeds to step 118.

On the contrary, while performing the timing verification step for a signal IO pin of the signal IO pin sequence, if the IO timing specification associated with the signal IO pin is violated, proceed to step 112.

Step 112: if the original driving parameters of a signal IO pin causes the signal IO pin to violate its associated IO timing specification, change the slew rate of its driving parameters, and proceed to step 114.

Step 114: perform a timing re-verification step; if the driving parameters of a signal IO pin are changed in step 112, then, according to the changed driving parameters, check again whether operation timing of the signal IO pin violates the associated IO timing specification. If the associated IO timing specification is again violated, proceed to step 116. Contrarily, if the associated IO timing specification is no longer violated, iterate to step 108, so cell type adopted to implement the signal IO pin can be selected according to the changed driving parameters.

Step 116: after changing the slew rate of a signal IO pin, if its associated IO timing specification still can not be satisfied, further change the driving strength associated with the signal IO cell by, for example, increasing the driving strength. Then, proceed to step 108, so steps 108 and 110 are repeated for the signal IO pin according to the driving parameters with the driving strength updated.

During steps 110 and 114, while checking whether operation timing of a signal IO pin violates its associated IO timing specification according to the associated driving parameters, the operation timing driven by the signal IO pin is obtained by a numerical simulation executed according to the driving parameters, supply, frequency, loading (step 106) and physical information of chip package (the design information 24) and circuit board (the design information 26) associated with the signal IO pin. Although each type of signal IO cell has rated driving strength and slew rate which can be utilized to predict operation timing (e.g., signal rise time and fall time) of the signal IO cell, parasite effects of chip package and circuit board degrade practical performance of the signal IO cell since the signal IO cell is coupled to its associated loading via the chip package and the circuit board. Because the prior art does not offer a way to consider physical information of chip package and/or circuit board during IO design, chip designer of prior art has to over-design driving parameters, and chip pin count reduction is thus compromised. With steps 110 and 114, however, factors such as supply, frequency, loading and physical information of chip package and circuit board are thoroughly taken into consideration by the flow 100 of the invention, over-design of driving parameters can therefore be effectively reduced or minimized.

Step 118: start IO design. First, insert an IO power cell and an IO ground cell in the IO design. At this moment, the IO design does not include any signal IO cell.

Step 120: from steps 110 to 118 and 120, the flow 100 has determined associated driving parameters and cell type for the signal IO cell of each signal IO pin. Accordingly, step 120 performs a signal IO cell insertion step by placing, in the IO design, a signal IO cell associated with a signal IO pin listed in the signal IO pin sequence. That is, for signal IO pins which are listed in the signal IO pin sequence but not yet included in the IO design, find a first one of them according to the logic order of the signal IO pin sequence, select its associated signal IO cell, and place the selected signal IO cell in the IO design.

Step 121: after adding a signal IO cell in the IO design (step 120), perform an SSO calculation step by a numerical SSD calculation (simulation) for signal IO cell(s) which are already placed in the IO design. In an embodiment, the numerical SSO calculation is executed according to physical layout parameters and geometric locations of the signal IO cells which are already included in the IO design. For example, for the signal IO cells placed in the IO design, each one of them is in turn selected as a static signal IO cell (which does not drive signal switching but attempts to keep signal level steady), and the rest of them are assumed to simultaneously drives output signal switching, thus the signal level of the static signal IO cell is obtained by numerical simulation. According to whether the simulated signal level is higher than the standard voltage ViL and/or lower than the standard voltage ViH, whether the IO design violates the ground SSO specification and/or the power SSO specification can be determined. During the numerical simulation, parasite effects of equivalent circuitry are extracted according to physical layout parameters and geometry locations of the placed signal IO cells, thus SSN suppression ability of the IO design is simulated closer to reality.

Step 122: perform an SSO verification step according to calculation result of step 121 to check whether the IO design violates the SSO specification (the design information 30); if not, proceed to step 130. If the IO design does violate the SSO specification, proceed to step 124.

Step 124: because the IO design violates the SSO specification, a decoupling capacitor can be included in the IO design. The decoupling capacitor can be implemented in core circuit region of chip to be coupled between the power voltage and the ground voltage. Then proceed to step 126.

Step 126: perform an SSO re-verification step by again examining whether the IO design violates the SSO specification according to a new numerical SSO calculation for the signal IO cells already placed in the IO design. Because the decoupling capacitor has been included in the IO design (step 124), effect to reduce SSO by the decoupling capacitor is reflected in the new calculation result. In an embodiment, the SSO re-verification is performed to check whether the IO design violates the power SSO specification and the ground SSO specification. If one of them is violated, proceed to step 128. If the IO design with the added decoupling capacitors no longer violates the power SSO specification and the ground SSO specification, iterate to step 121.

Step 128: if the IO design with the added decoupling capacitor still violates the SSO specification, add an IO power cell and/or an IO ground cell according to which specification(s) is/are violated. If the IO design violates the power SSO specification, then add an IO power cell, which includes an IO power pad, to the IO design. Similarly, if the IO design violates the ground SSO specification, then add an IO ground cell, which owns an IO ground pad, to the IO design. Then the flow 100 continues to step 121.

Step 130: if all the signal IO pins listed in the signal IO pin sequence have been implemented in the IO design, proceed to step 132; if there is any signal IO pin/cell which is not implemented/placed, iterate to step 120.

Step 132: end the flow 100. The flow 100 can repeat for different power domains of a chip. That is, signal IO pins of a same power domain are listed in a same signal IO pin sequence; by executing the flow 100 for this signal IO pin sequence, an IO design for this power domain is provided with associated signal IO cells being arranged for all signal IO pins of the signal IO pin sequence and a proper number of IO power cells and/or IO ground cells being inserted in-between.

As demonstrated by aforementioned description, the flow 100 of the invention sequentially places signal IO cells of the signal IO pins one by one in the IO design according to the signal IO pin sequence; after a signal IO cell is placed to update the IO design, a numerical SSO calculation is executed for the updated IO design to check if the update IO design violates the SSO specification (steps 120, 121 and 122). If violated, the flow 100 proceeds to step 124 and/or step 128 to improve the IO design until the IO design does not violate the SSO specification anymore; then the flow 100 repeats to steps 120, 121 and 122 to place a next signal IO cell in the IO design for a next signal IO pin to be implemented. Therefore, the invention indeed evaluates SSN suppression ability of IO design according to geometric locations and physical layout parameters of placed signal IO cells, such that factors like geometric locations (and associated parasite effects) are integrated into consideration of IO design, and over-design of IO power cell and IO ground cell is hence effectively reduced.

In the flow 100, steps 124 and 126 can be optionally skipped; that is, if the IO design violates the SSO specification at step 122, the flow 100 can continue to step 128 directly from step 122, and iterate to step 121 from step 128.

Figure 3:
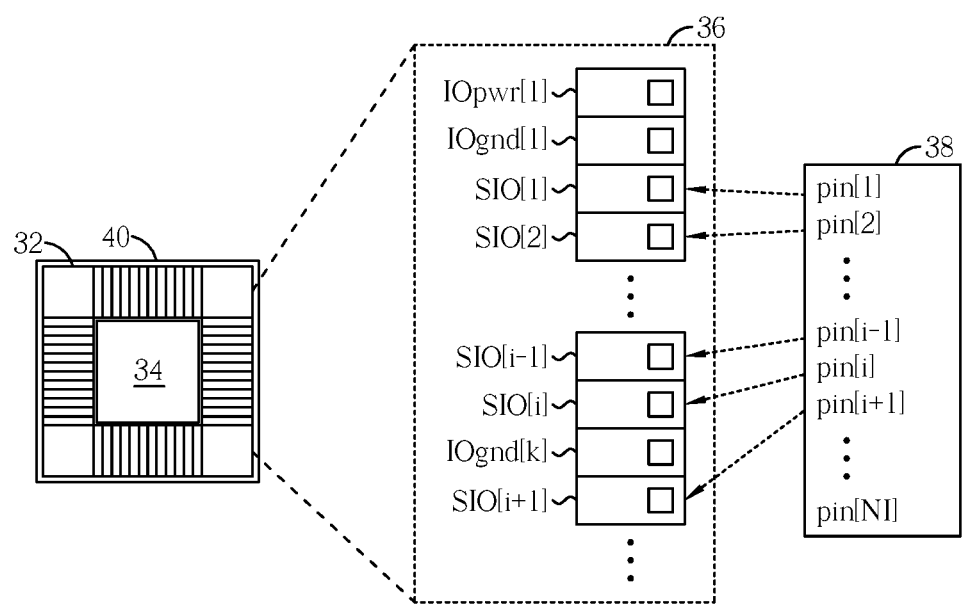
FIG. 3 illustrates an embodiment for providing an IO design of a chip according to the flow shown in FIG. 2.

Please refer to FIG. 3 illustrating an embodiment to provide an IO design 36 for a chip 40 following the flow 100. The chip 40 includes a core circuit 34 and an IO interface 32, and the IO design 36 is to be implemented at IO ring of the IO interface 32, such that signal IO cells are arranged according to a signal IO pin sequence 38, and a proper number of IO power cells as well as a proper number of IO ground cells are inserted at proper locations. According to a logic order of signal IO pins, the signal IO pin sequence 38 has NI signal IO pin[1], pin[2], . . . , pin[i] to pin[NI] which are to be implemented. After the flow 100 starts, associated driving strength and slew rate for each of all the signal IO pins pin[1] to pin[NI] are defined through steps 102 to 116, and accordingly associated signal IO cell is chosen for each signal IO pin[i]. Then, the flow 100 proceeds to step 118 to first place an IO power cell IOpwr[1] and an IO ground cell IOgnd[1] in the IO design 36.

After step 118, execution of step 120 add a first signal IO cell SIO[1] to the IO design 36 for the first signal IO pin[1]. Then, a numerical SSO calculation and a violation check of the SSO specification are executed during steps 121 and 122 for the IO design 36, which currently includes the IO power cell IOpwr[1], the IO ground cell IOgnd[1] and the signal IO cell SIO[1]. Assuming the currently developed IO design 36 satisfies the SSO specification, the flow 100 repeats to step 120 from step 130, and hence places another signal IO cell SIO[2] associated with the second signal IO pin[2] of the signal IO pin sequence 38. For the updated IO design 36 which now included the newly added signal IO cell SIO[2], the flow 100 repeats steps 121 and 122.

By iteration of steps 120, 121, 122 and 130, it is assumed that the flow 100 has added associated signal IO cells SIO[1] to SIO[i−1] to the IO design 36 respectively for the signal IO pin[1] to pin[i−1], completes the numerical SSO calculation for the placed signal IO cells SIO[1] to SIO[i−1] in the IO design 36, and then proceeds step 122. During step 122, assuming the currently developed IO design still satisfies the SSO specification, the flow 100 thus repeats to step 120 from step 130 to add a signal IO cell SIO[i] to the IO design 36 for implementing the signal IO pin[i] of the signal IO pin sequence 38, and then proceeds to steps 121 and 122. However, after the signal IO cell SIO[i] is added, assuming the resultant IO design 36 therefore violates the SSO specification, the flow 100 will divert to step 124 from step 122. After step 126, assuming the IO design 36 still violates the ground SSO specification, the flow 100 then continues to step 128 to place an additional IO ground cell IOgnd[k] in the IO design 36, and repeats steps 121 and 122. After adding the IO ground cell IOgnd[k], assuming the resultant IO design 36 does not violate the SSO specification, the flow 100 goes back to step 120 from step 130, and places an associated signal IO cell SIO[i+1] next to IO ground cell IOgnd[k] for the signal IO pin[i+1], as shown in FIG. 3. The signal IO cells SIO[1] to SIO[i+1] can be signal IO cells of a same type or different types; in other words, even the IO design includes signal IO cells of different cell types, the invention adaptively inserts IO power cells and/or IO ground cells in response to practical demands of the SSO specification.

To sum up, comparing to prior art, the invention integrates practical factors, such as geometric locations, physical layout parameters and parasite effects of chip package and circuit board, into consideration while providing IO design according to demands of SSO specification, hence prevents over-design of driving parameters and pin count, effectively reduce quantities of IO power cells/pads/pins and IO ground cells/pads/pins, and lowers chip cost. If there are too many IO power pins and IO ground pins in a chip due to over-design, the chip becomes a pad-limited pad; that is, overall chip layout area is dominated by quantity of pads. Contrarily, since counts of IO power pins and IO ground pins in a chip can be effectively reduced according to the invention, the chip becomes a core-limited chip; it means that chip layout area is fully utilized to implement planned chip functions, rather than dominated by IO interface. The flow 100 of the invention can be implemented by a computer system. For example, numerical calculation and simulation can be executed by computer system.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for input/output (IO) design of a chip, comprising:
    performing a signal IO cell insertion step by placing a first signal IO cell in the IO design according to a signal IO pin sequence;
    by computer, performing an SSO verification step by calculating whether the IO design violates an SSO specification; and
    if the IO design does not violate the SSO specification, repeating the signal IO cell insertion step to update the IO design by adding a second signal IO cell, and repeating the SSO verification step by calculating whether the updated IO design violates the SSO specification; wherein:
    the signal IO pin sequence comprises a logic arrangement order of a plurality of signal IO pins,
    each signal IO pin associates with a signal IO cell,
    the logic arrangement order remains unchanged during repeating of the signal IO cell insertion step, and
    the method further comprises:
    while repeating the signal IO cell insertion step, following the logic arrangement order to place the second signal IO cell, such that:
        if, in the logic arrangement order, a signal IO pin associated with a middle signal IO cell is between two signal IO pins respectively associated with the first signal IO cell and the second signal IO cell, then the second signal IO cell is placed to cause the middle signal IO cell to be between the first signal IO cell and the second signal IO cell.

2. The method of claim 1 further comprising:
    if the IO design violates the SSO specification, adding a decoupling capacitor in the IO design, and performing an SSO re-verification step by checking whether the IO design violates the SSO specification according to a numerical SSO calculation for signal IO cells placed in the IO design.

3. The method of claim 2 further comprising:
if the IO design violates the SSO specification according to the SSO re-verification step, adding an IO supply cell in the IO design;
wherein the IO supply cell includes an IO supply pad for coupling a power voltage or a ground voltage.

4. The method of claim 2, wherein the SSO specification comprises a power SSO specification and a ground SSO specification, and the SSO re-verification step is performed by checking whether the IO design violates the power SSO specification and the ground SSO specification.

5. The method of claim 4 further comprising:
if the IO design violates the power SSO specification according to the SSO re-verification step, adding an IO power cell in the IO design;
wherein the IO power cell comprises an IO power pad for coupling a power voltage.

6. The method of claim 4 further comprising:
if the IO design violates the ground SSO specification according to the SSO re-verification step, adding an IO ground cell in the IO design;
wherein the IO ground cell comprises an IO ground pad for coupling a ground voltage.

7. The method of claim 2, wherein the numerical SSO calculation is performed according to physical layout parameters and locations of the signal IO cells placed in the IO design.

8. The method of claim 1, wherein each of the signal IO pins associates with an IO timing specification, and the method further comprises:
performing a setting step by setting associated driving parameters for each of the signal IO pins;
performing a timing verification step by checking, according to the associated driving parameters of each of the IO pins, whether operation timing of each of the signal IO pins violates the associated IO timing specification.

9. The method of claim 8 further comprising:
if operation timing of one of the signal IO pins does not violate the associated IO timing specification according to the timing verification step, setting an associated cell type for the signal IO pin according to the associated driving parameters of the signal IO pin;
wherein the signal IO cell insertion step further comprises:
while placing the first signal IO cell according to one of the signal IO pins of the signal IO pin sequence, selecting the first signal IO cell to be placed in the IO design according to the associated cell type of the signal IO pin.

10. The method of claim 8, wherein the driving parameters comprises a driving strength and a slew rate, and the method further comprises:
if operation timing of one of the signal IO pins violates the associated IO timing specification according to the timing verification step, changing the slew rate of the associated driving parameters, and performing a timing re-verification step by checking whether operation timing of the signal IO pin violates the associated IO timing specification after the changed driving parameters are applied.

11. The method of claim 10 further comprising:
if operation timing of the signal IO pin violates the associated IO timing specification according to the timing re-verification step, changing the driving strength of the associated driving parameters and accordingly repeating the setting step.

12. The method of claim 10 further comprising:
if operation timing of the signal IO pin does not violate the associated IO timing specification according to the timing re-verification step, repeating the setting step, such that an associated cell type for the signal IO pin is set according to the changed driving parameters associated with the signal IO pin;
wherein the signal IO cell insertion step further comprises:
while placing the first signal IO cell according to one of the signal IO pins of the signal IO pin sequence, selecting the first signal IO cell to be placed in the IO design according to the associated cell type of the signal IO pin.

13. The method of claim 8, wherein while checking whether operation timing of one of the signal IO pins violates the associated IO timing specification according to the associated driving parameters, the operation timing is obtained by a numerical simulation timing executed according to the driving parameters, supply, frequency, chip package, circuit board and/or loading associated with the signal IO pin.

14. The method of claim 1 further comprising:
if the IO design violates the SSO specification according to the SSO verification step, adding an IO supply cell in the IO design;
wherein the IO supply cell includes an IO supply pad for coupling a power voltage or a ground voltage.

15. The method of claim 1, wherein the SSO specification comprises a power SSO specification and a ground SSO specification, and the SSO verification step is performed by checking whether the IO design violates the power SSO specification and the ground SSO specification.

16. The method of claim 15 further comprising:
if the IO design violates the power SSO specification according to the SSO verification step, adding an IO power cell in the IO design;
wherein the IO power cell comprises an IO power pad for coupling a power voltage.

17. The method of claim 15 further comprising:
if the IO design violates the ground SSO specification according to the SSO verification step, adding an IO ground cell in the IO design;
wherein the IO ground cell comprises an IO ground pad for coupling a ground voltage.

* * * * *